June 6, 1939.  P. M. CONTANT  2,160,832
WATER TREATMENT
Filed May 26, 1937
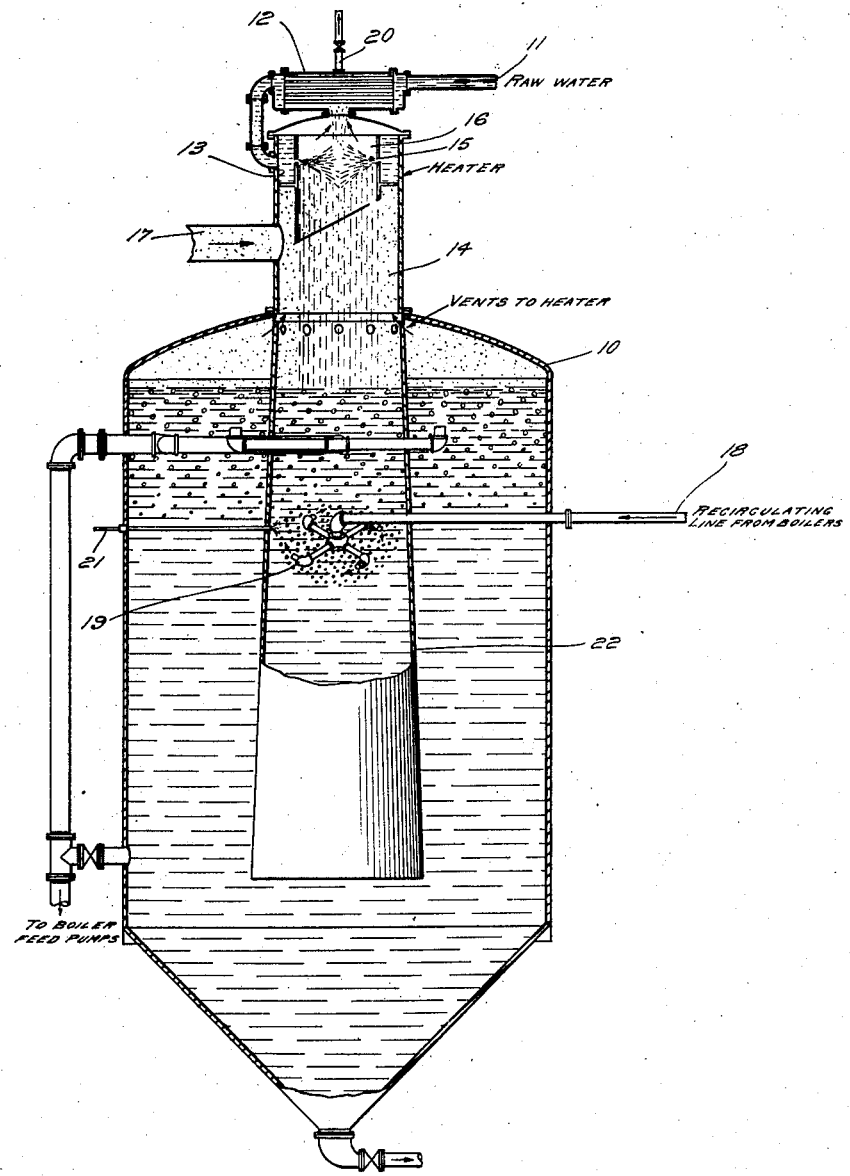

Patented June 6, 1939

2,160,832

UNITED STATES PATENT OFFICE 2,160,832

WATER TREATMENT

Peter M. Contant, Maywood, N. J., assignor to Neckar Company, Inc., a corporation of New York Application May 26, 1937, Serial No. 144,899

12 Claims. (Cl. 210—14)

My present invention relates to a process of treating water to remove undesirable substances.

Various methods have heretofore been used for removing undesirable substances from water, such as chemical treatments, heating, boiling, and the like, one method now in use being disclosed in applicant's Patent No. 1,819,149 granted August 18, 1931. The present invention relates to improvements for obtaining a better removal of impurities and undesirable substances, and at the same time reducing the amount of chemicals required for water treatment.

Further objects and advantages will be readily apparent from the detailed description and the accompanying figure, showing a sectional elevation of a preferred structural arrangement for carrying out the invention.

Water containing undesirable impurities, which may be raw water or treated water, is led into a preheater 14 from an inlet pipe 11, through a vent condenser 12, and into a jacket 13 positioned at the upper end of the preheater 14, the water spraying through nozzles or similar openings 15 into a mixing chamber 16, where the water is brought into direct contact with steam entering through an inlet pipe 17, the steam being preferably exhaust steam of the usual temperature range. The spraying of the water through the nozzles or openings 15 provides a large contact surface between the water and steam. The direct contact heating by means of steam, which may be live steam or exhaust steam, raises the temperature of the water to within a few degrees of the steam temperature, tests indicating that the water is heated to within 2° F. of the steam temperature. It is not however possible to produce a boiling condition because the transfer of heat from the steam to the liquid depends on the temperature difference between the two fluids; when the temperature of the water reaches the temperature of the steam, there can be no further heat transfer, and boiling cannot occur in view of the heat of evaporation required.

The heated water enters the central reaction chamber 22 of the treatment tank 10. The reaction chamber is preferably formed as a depending slightly conical tube, and in which additional heat is supplied in the form of steam injected below the water level. This steam is preferably high temperature steam, and is introduced through an inlet conduit 18. The conduit 18 extends into the reaction chamber 22, and has a plurality of tangential outlet nipples 19 for discharging the steam in a tangential direction to the circumference of the chamber 22, the steam being sprayed in sufficient quantity and at sufficient pressure to produce and to maintain a boiling condition in the upper part of the chamber 22.

This boiling serves to remove free carbon dioxide originally in solution in the water, which vents through valve controlled vents 20 at the top of a mixing chamber, the removal of the free carbon dioxide resulting in a reduction of the bicarbonates of calcium and magnesium to normal carbonates, thus removing part of the water hardness. The normal carbonates are much less soluble than the bicarbonates, and the heat reaction described thus causes removal from solution of a considerable portion of the hardness imparting impurities. To further render the calcium and magnesium salts insoluble, chemical reagents are introduced into the chamber 22 through a conduit 21, the reagents forming insoluble reaction products with the calcium and magnesium salts still in solution in the water. The chemical reagents, such as hydrated lime, are introduced after the water has been exposed to boiling for a sufficient time interval to get the maximum benefit from the heat reactions with respect to the removal of the hardness producing salts, thus reducing the amount of reagents required.

The tangential discharge of the heating steam produces a thorough uniform mixing and agitation of the reagents with the heated water, which physical condition is conducive to completeness of chemical reactions; the maintenance of a boiling condition in the water when the chemical reagents are introduced results in greater speed of the chemical reactions in addition to benefiting the completeness of these reactions.

The insoluble reaction products created by the treatment described above are removed from the water by settling. The tangential discharge of steam sets up a rotary motion of the water in the lower part of the reaction chamber 22, and this rotary motion extends beyond the central chamber into the outer space of the tank until it is exhausted by friction.

The removal of the suspended solids is based on the downward velocity given to the solids by gravity. The motion of the water in the central chamber is a combination of a downward flow and the rotary motion referred to above; when the water leaves the central chamber the direction of flow is reversed from downward to upward during which change there is a period of horizontal flow, and part of the suspended material which has a gravitational velocity, will separate itself from the liquid during this period. During the upward flow the separation of suspended material from the liquid continues as a result of gravitational velocity, as long as the upward velocity of the liquid is less than the relative downward velocity of the suspended solids. The upward velocity of the liquid will be a minimum if flow conditions are uniform over the whole area of the outer space of the tank and this uniformity is promoted by the rotary motion of the liquid described above, which rotary motion has no vertical components and therefore has no direct effect on vertical velocities but because of the fact that it is practically impossible to have perfect heat insulation on the shell of the tank there will always be a different rate of heat transmission at different points of the circumference. Such heat transmission to the surrounding atmosphere will cause a temperature drop of the liquid and would lead to interference from convection currents with the settling process, if no steps were taken to provide for uniform conditions for the circumference of the tank. This is accomplished by the rotary motion of the water described supra.

While I have described a specific water heater construction and a specific water treatment, changes in the heating tank and reaction chamber layout, and in the details of the method followed, may be made to suit different treatment requirement conditions, without departing from the spirit and the scope of the invention as defined in the appended claims.

I claim:

1. In a water purification system, a water preheating chamber, a conduit for supplying heating fluid thereto, a heat reaction chamber receiving the heated water from said preheating chamber, a settling tank receiving the heated water from said heat-reaction chamber, means for additionally heating the water in said reaction chamber, and means for supplying treatment chemicals to said additionally heated water.

2. In a water purification system, a water preheating chamber, a conduit for supplying heating fluid thereto, a heat reaction chamber receiving the heated water from said preheating chamber, a settling tank receiving the heated water from said heat-reaction chamber, means for additionally heating the water in said reaction chamber, means for supplying treatment chemicals to said additionally heated water, and means for agitating said additionally heated and chemically treated water.

3. In a water purification system, a water preheating chamber, means for supplying heat thereto, a settling tank, a tubular heat reaction chamber immersed in said settling tank and receiving heated water from said heating tank at one end thereof and discharging the water to the settling tank at the other end thereof, means for additionally heating the water in said reaction chamber, and means for supplying chemicals to the water in said reaction chamber.

4. In a water purification system, a water preheating chamber, a conduit for supplying heating fluid thereto, a heat reaction chamber receiving the heated water from said heating chamber, a settling tank receiving the heated water from said heat-reaction chamber, means for additionally heating the water in said reaction chamber, means for supplying treatment chemicals to said water in said heat reaction chamber, and means for imparting a rotative effect to said heat reacted and chemically treated water.

5. In a water purification system, a water preheating chamber, a conduit for supplying heating fluid thereto, a heat raction chamber receiving the heated water from said preheating chamber, a settling tank receiving the heated water from said heat-reaction chamber, means for additionally heating the water in said reaction chamber to produce boiling, and means for supplying treatment chemicals to said boiling water.

6. In a water purification system, a water preheating chamber, means for supplying heat thereto, a settling tank, a tubular heat reaction chamber immersed in said settling tank and receiving heated water from said heating tank at one end thereof and discharging the water to the settling tank at the other end thereof, means for additionally heating the water in said reaction chamber to produce boiling, means for supplying chemicals to the boiling water in said reaction chamber, and means for agitating said boiling and chemically treated water.

7. In a water purification system, a water preheating chamber, a conduit for supplying heating fluid thereto, a heat reaction chamber receiving the heated water from said heating chamber, a settling tank receiving the heated water from said heat-reaction chamber, means for additionally heating the water in said reaction chamber to produce boiling, means for supplying treatment chemicals to said boiling water in said heat reaction chamber, and means for imparting a rotative effect to said boiling and chemically treated water.

8. A method of water purification for water comprising the steps of preheating raw water to heat react hardness imparting salts, additionally heat reacting the treated water, and treating the heat reacted water with chemical reagent means.

9. A method of water purification for water comprising the steps of preheating raw water to heat react hardness imparting salts, additionally heat reacting the treated water, treating the heat reacted water with chemical reagent means, and agitating the treated water.

10. A method of water purification for water comprising the steps of preheating raw water to heat react hardness imparting salts, additionally heat reacting the treated water, treating the heat reacted water with chemical reagent means, and imparting a rotative movement to the treated water.

11. A method of water purification for water comprising the steps of preheating raw water to heat react hardness imparting salts, additionally heat reacting the treated water to produce boiling, and treating the heat reacted water with chemical reagent means.

12. A method of heating water to a high temperature comprising heating said water by surface contact with heating steam, collecting the heated water in a vertical tubular reaction chamber, injecting additional heating steam into said reaction chamber, storing the heated water from said reaction chamber in a storage space surrounding said reaction chamber, and withdrawing heated water from said storage space at a level below the level of the water in said reaction chamber.

PETER M. CONTANT.